Figure 3:
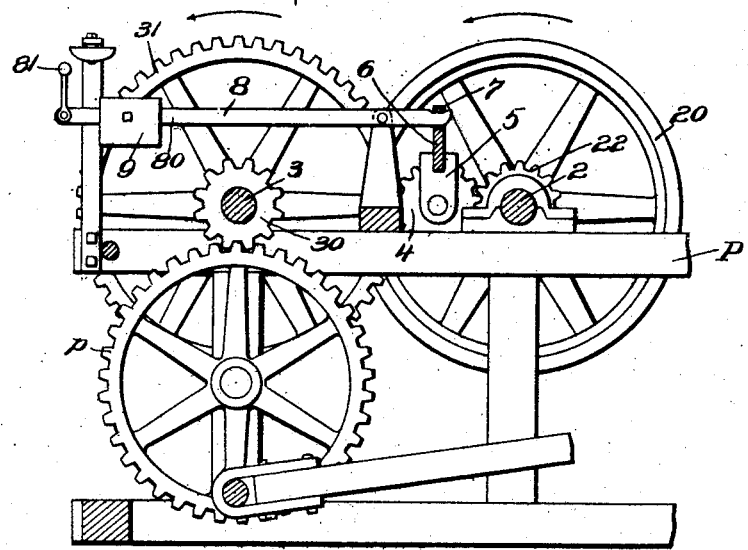

No. 854,070. PATENTED MAY 21, 1907.
M. I. WILSON.
GEAR EVENER AND POWER INDICATING MEANS.
APPLICATION FILED MAY 4, 1906.
2 SHEETS—SHEET 1.
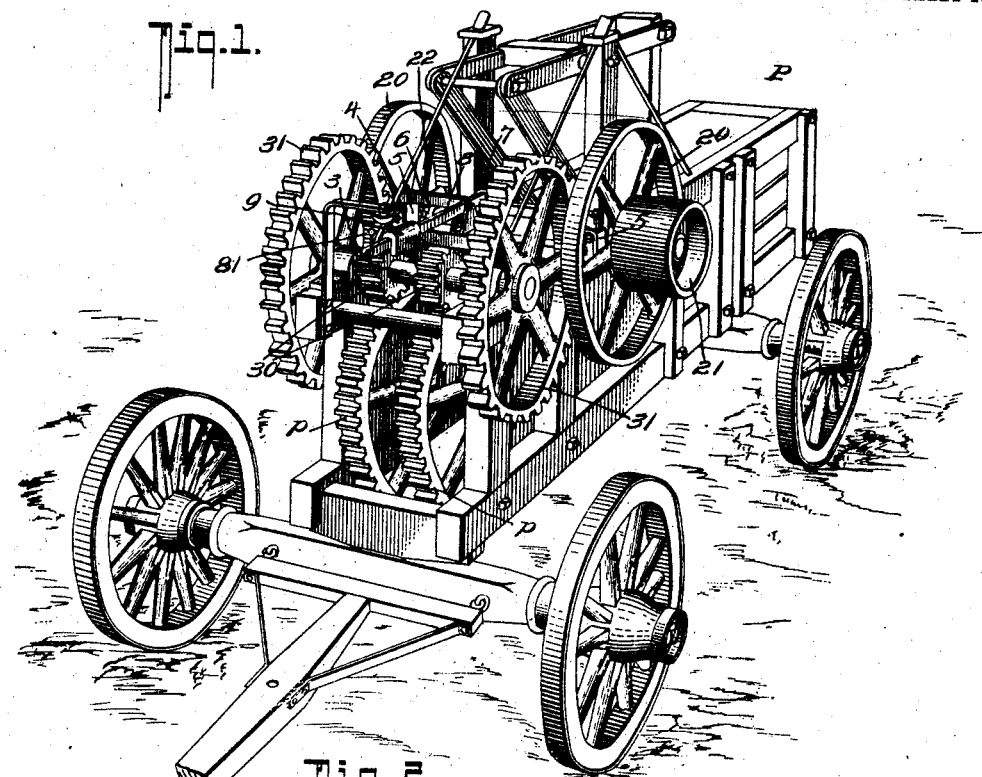
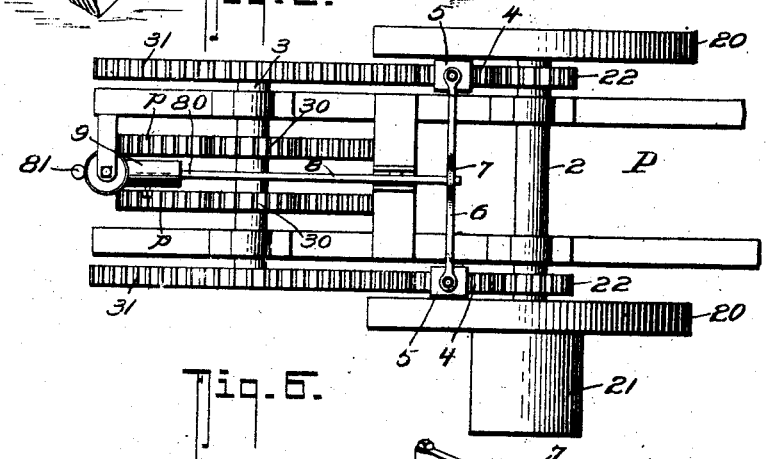
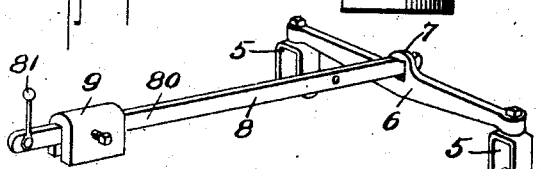
WITNESSES:
F. C. Gibson.
John T. Schrott
INVENTOR
M. I. Wilson.
BY
Fred G. Dieterich & Co.
ATTORNEYS No. 854,070. PATENTED MAY 21, 1907.
M. I. WILSON.
GEAR EVENER AND POWER INDICATING MEANS.
APPLICATION FILED MAY 4, 1906.

2 SHEETS—SHEET 2.

WITNESSES:
F. C. Gibson.
John T. Schrott.

INVENTOR
M. I. Wilson.

BY
Fred G. Dieterich & Co.
ATTORNEYS

UNITED STATES PATENT OFFICE.

MYRON IRVING WILSON, OF OHLMAN, ILLINOIS.

GEAR-EVENER AND POWER-INDICATING MEANS.

No. 854,070.  Specification of Letters Patent.  Patented May 21, 1907.

Application filed May 4, 1906. Serial No. 315,200.

*To all whom it may concern:*

Be it known that I, MYRON IRVING WILSON, residing at Ohlman, in the county of Montgomery and State of Illinois, have invented a Gear-Evener and Power-Indicating Means, of which the following is a specification.

My invention seeks to provide certain new and useful means for maintaining a uniform or even connection of the drive gearing for presses and which also automatically operates to indicate the power pressure on the machine in excess of that for which the machine is set.

In some of the ordinary types of presses, for example, as shown in the drawings, the actuating gearing includes a belt driven shaft having a pinion or cog wheel at each side of the machine that mesh with a pair of correspondingly arranged spur or toothed wheels mounted on a single shaft parallel with the belt driven shaft that has the power transmitting pinions or gears therein.

From practical experience in the handling of machines of this kind, I have found that if one end of either the drive shaft or the driven shaft raises or lowers by reason of irregular wear or adjustment of the journal bearings therefor, or if the locking key for either of the intermeshing gears on the said two shafts shifts or loosens its proper position the least bit, one or the other of the drive gears has all the pull, this being especially so with the larger gears, since the least movement of the locking key for said large gear loosens the said gear to such extent that the loose movement amounts to half a cog or more at the circumference, thereby creating an uneven or un-uniform drive action of both sets of meshing gears at the opposite sides of the machine, and often creates a wedge or prying action on the back cog wheel in mesh with the other cog having the slight loose play.

The prime object of my invention is to provide simple, effective and economically constructed means for controlling the intermeshing positions of the drive and the driven gears at the opposite sides of the machine, whereby to maintain a uniform and even drive or power transmitting connection between the driver and driven gears.

Another and important feature of my invention is the utilization of the gear evener devices as a means for automatically actuating an alarm or indicator whenever the power applied to the machine is in excess of that for which it may be set without losing its operativeness for maintaining an even and uniform connection between the driver and driven gears.

My invention therefore comprehends certain features of construction, combination of parts, and novel details of construction, all of which will hereinafter be fully described, pointed out in the claims and illustrated in the accompanying drawings, in which:—

Figure 4:
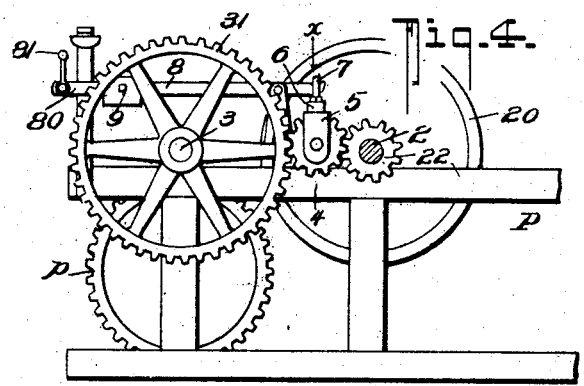
Figure 5:
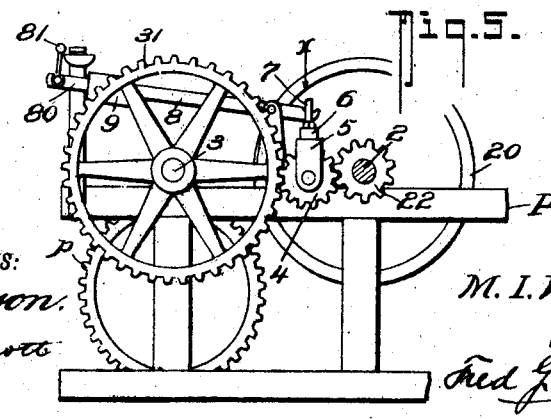

Figure 1, is a perspective view of my invention applied to so much of a press actuating gear mechanism necessary to illustrate the correlative arrangement of parts. Fig. 2, is a plan view of my improvements, together with the driving shaft, the driven shaft and the intermeshing gears. Fig. 3, is a transverse section of the parts shown in Fig. 2. Fig. 4, is a side elevation of the same, the evener or intermediate gear, its supporting means and the gong actuating and weighted lever being at a normal position. Fig. 5, is a similar view, the evener gear being shifted to the position it assumes when the press is under excess pressure and the weighted lever shifted to sound the gong. Fig. 6, is a perspective view of the evener bar, the gear holding stirrups and the weighted or tension lever hereinafter referred to.

In the drawing P designates a portion of a hay press, $p$—$p$ the large gears that actuate the compressing or follower devices, not shown, since they may be of any well-known construction.

2 designates the driving shaft mounted transversely in suitable bearings on top of the press frame, which has at one end the usual balance wheel 20 and at the other end the belt pulley 21, and at each end it has keyed or otherwise made fast thereon, a drive pinion 22—22.

3 designates a driven shaft also suitably journaled on top of the press box over the actuating gears $p$—$p$, and which has fixedly attached thereto drive pinions 30—30 that mesh with the gears $p$—$p$, and at each end said shaft also carries a large spur or cog wheel 31—31 which is driven from the belt shaft in the manner now to be explained.

It should be stated that in the usual way of building the type of press shown, the spur wheels 31 are held in direct mesh with the drive pinions 22 on the belt drive shaft 2. In my construction, the said pinions 22 and spur or cog wheels 31 are separated and are joined by the intermediate or evener gear wheels 4—4, the arrangement of which and the manner in which they automatically actuate the indicator device, being clearly shown in Figs. 2 & 4 by reference to which it will be observed each gear or pinion 4 is journaled in a stirrup 5 and the two stirrups are pendently supported on the opposite ends of a transversely disposed evener bar 6, which is loosely supported on loop 7, connected to the center of the bar 6 and hung from the front end of a lever 8, disposed at right angle to the bar 6, i. e., in the longitudinal plane of the machine. The lever 8 is fulcrumed near the end that holds bar 6 and has a long arm 80 whereby a very little pull on the fulcrumed end of the lever will be largely multiplied at the free end to provide for said end actuating an annunciator or indicator, which, in the drawings, I have shown as a gong adapted to be engaged by a hammer 81 on the end of lever 8.

To provide for the desired tension of the lever to properly compensate for the normal power for which the machine may be adjusted, I mount an adjustable weight 9 on the free end of the lever 8, by sliding of which inwardly or outwardly on the said lever, (it being held to its set position by a screw 90), the tension of the lever is increased or decreased and hence the predetermined time at which the position of the loose gears 5 relatively to the driving and driven gears in mesh therewith is shifted, can be readily regulated by adjusting the aforesaid weight 9.

From the foregoing description, taken in connection with the drawings, the complete arrangement, the operation and the advantages of my invention will be readily understood. By reason of the independent supports for the intermediate or evener gears, it is manifest that should either the drive or driven shafts vary or loosen in their bearings from wear or the driving or driven gears become slightly loosened or shifted, the intermediate gears will automatically adjust themselves to such changed conditions of the gears and shafts, and since the actions of the intermediate or evener gears are independent of each other, danger of binding or torsional strain on either of the shafts and shaft held gears is entirely overcome and breakage of said parts is thereby reduced to the minimum. It should be stated that in setting the intermediate or evener gears with respect to the gears with which they mesh the said evener gears are set with their axis slightly above the centers of the two gears they engage as best shown in Fig. 4 which shows the normal arrangement of one set of driver, driven and evener gears, and by reason thereof so long as the load on the machine is not in excess of the tension or counterpoise of the lever 8, the said gears will maintain substantially their normal relation. When the load or pull on the machine is in excess of the normal, the bind on the several gears is such as to crowd the intermediate or evener gear down in the direction indicated by arrow $x$, and though this movement, in the practical arrangement of my invention does not exceed one fourth of an inch, such movement is sufficient to cause it to actuate the alarm or indicator, which latter in practice is so positioned that the press feeder can quickly see what the machine is doing.

Another advantage of my invention is that the lever 8, the loosely held gears and the weight can be so relatively formed or arranged that the weight of the bales can be uniformly maintained.

While the arrangement of the several parts shown in the drawing illustrates a simple application of my invention, it is understood that the said arrangement of parts may be readily modified without departing from my invention and the scope of the appended claims.

Having thus described my invention, what I claim and desire to secure by Letters Patent, is:—

1. The combination with a driving shaft a drive pinion at each end, a driven shaft a cog or spur wheel at each end in alinement with the drive shaft pinions; an idler pinion between each set of drive pinions and driven spur wheels, and means for loosely suspending said idlers to intermesh with the gears on the driving and driven shaft.

2. The combination in a drive gear mechanism, of a drive shaft, a driven shaft, a pair of drive gears on the drive shaft, and a pair of spur wheels on the driven shaft in alinement with the drive gears, and an indicator; of an idler gear for each set of driver and driven gears, means for holding said idlers in mesh with the driver and driven gears, said idlers having a limited shiftable movement and adapted to automatically actuate the indicator devices under a predetermined resistance of the driven gears thereon.

3. The combination with the drive shaft and its gears, the driven shaft and its gears driven from the drive gears, and an alarm; of a pivoted lever having an adjustable counterpoise at one end, and a hammer to engage the alarm; a bar disposed transversely of the lever, centrally supported on the front end of the lever, and a gear loosely suspended from each end of the bar held to mesh with the drive and driven gears at each side of the machine, for the purposes described.

4. The combination with the drive shaft and the driven shaft, the spur wheels on the driven shaft and the drive pinions or gears on the drive shaft; of a bar held in parallel plane with the drive and driven shafts, a stirrup pendently supported from each end of the bar and a gear loosely journaled in each stirrup, said gears being held to mesh with the driving and driven gears on the driving and driven shafts aforesaid.

MYRON IRVING WILSON.

Witnesses:
J. O. HENDERSON,
HARRY McKAY.